No. 775,253. Patented November 15, 1904.

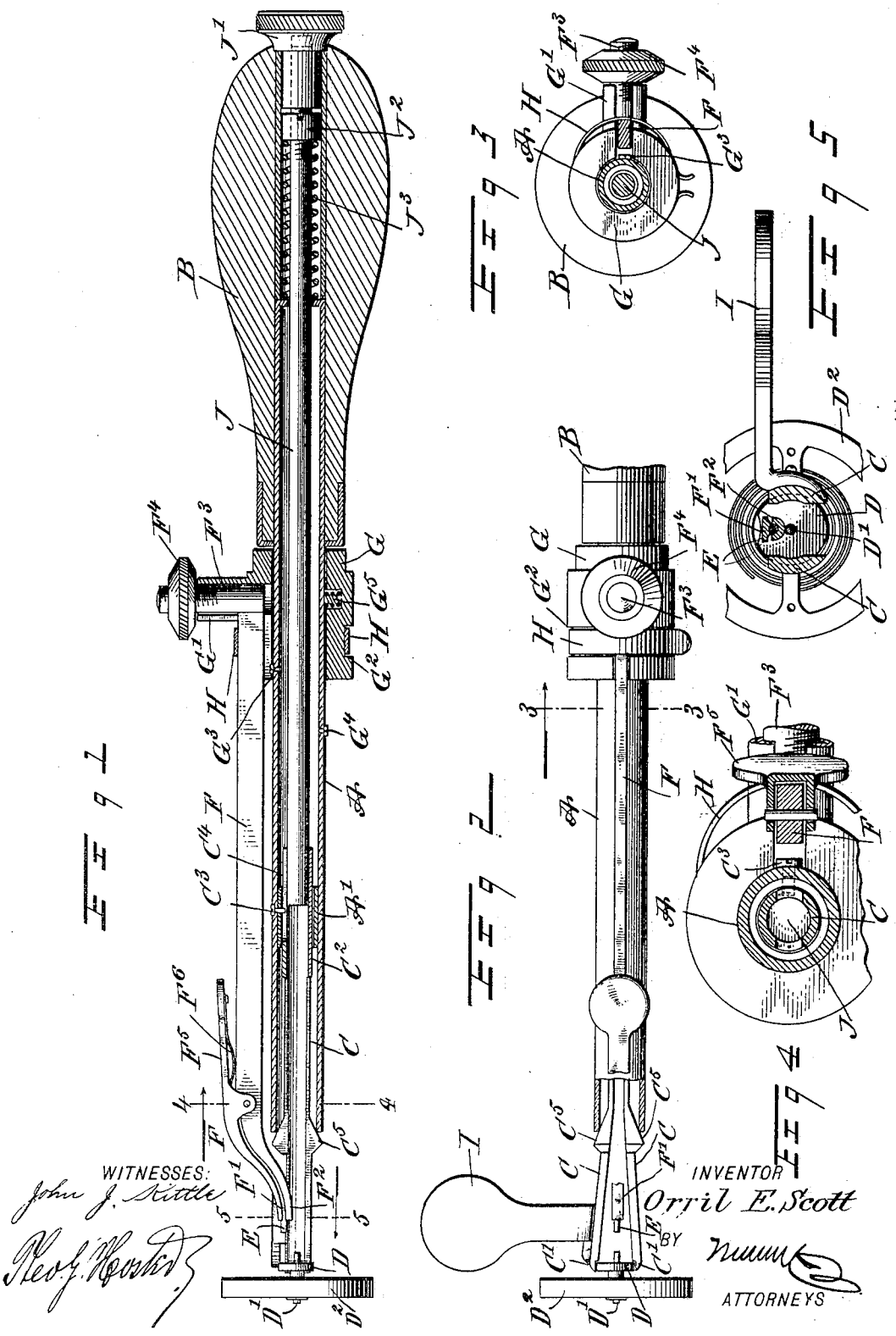

UNITED STATES PATENT OFFICE.

ORRIL ELBRIDGE SCOTT, OF WATERBURY, VERMONT.

JEWEL-PIN SETTER.

SPECIFICATION forming part of Letters Patent No. 775,253, dated November 15, 1904.

Application filed July 19, 1904. Serial No. 217,265. (No model.)

*To all whom it may concern:*

Be it known that I, ORRIL ELBRIDGE SCOTT, a citizen of the United States, and a resident of Waterbury, in the county of Washington and State of Vermont, have invented a new and Improved Jewel-Pin Setter, of which the following is a full, clear, and exact description.

The invention relates to watchmakers' tools; and its object is to provide a new and improved jewel-pin setter arranged to insure an accurate setting of the ruby-pin without removal of the roller-table or hair-spring from the balance-wheel to prevent the rim of the balance-wheel from being subjected to heat, and hence injured by the heat employed in melting the shellac used for fastening the ruby-pin in position in the roller-table.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is an enlarged longitudinal sectional elevation of the improvement. Fig. 2 is a plan view of the same broken off at one end. Fig. 3 is a cross-section of the same on the line 3 3 of Fig. 2. Fig. 4 is a similar view of the same on the line 4 4 of Fig. 1, and Fig. 5 is an enlarged cross-section of the same on the line 5 5 of Fig. 1.

A tubular bearing A is provided at one end with a suitable handle B, and through the other end of the tubular bearing A project spring-arms C, formed at their outer ends with jaws C' for engaging the periphery of the roller-table D at diametrically opposite points to securely clamp the roller-table in position between the jaws, thus supporting the staff D' and the balance-wheel D² on the staff with the roller-table D. The ruby-pin E to be fastened in an aperture in the roller-table D is held between the jaws F' F² of a jewel-holder F, extending longitudinally outside of the tubular bearing A, as plainly illustrated in Fig. 1. The rear end of the holder F is provided with an upwardly-extending rod F³, mounted to slide in a suitable bearing G', formed on the top of the slide G, mounted to slide lengthwise on the tubular bearing A, the said slide G when in rearward position abutting against the inner end of the handle B. The slide G is prevented from turning on the bearing A by the head of a screw G³ extending into a longitudinal slot formed in the slide G, the said screw G³ being secured to the bearing A. The forward sliding movement of the slide G is limited by a stop-pin G⁴ in the form of a screw screwing in the bearing A. Normally the slide G is held in position against accidental movement by a spring G⁵, set in a recess in the slide G and pressing against the peripheral face of the bearing A, as plainly indicated in Fig. 1.

The upper end of the rod F³ is preferably threaded and on the threaded portion screws a nut F⁴, adapted to be turned by the operator to raise or lower the rod F³, and with it the holder F, to bring the ruby-pin E between the jaws F' F² into proper position relative to the aperture in the roller-table D.

A spring H, preferably in the form of a split or open ring, encircles the slide G in an annular groove G², and the said spring presses the top of the holder F, so as to normally hold the nut F⁴ in contact with the upper end of the bearing G'. The jaw F² of the holder preferably forms an integral part thereof, while the jaw F' is fulcrumed on the holder F and is provided with a finger-piece F⁵, pressed on by a spring F⁶, secured to the under side of the finger-piece and engaging the top edge of the holder F. Thus the spring F⁶ serves to hold the jaw F' in a closed position—that is, to securely clamp the ruby-pin E in position between the jaws. When the operator presses the finger-piece F⁵, the jaw F' opens to release the ruby-pin E after the latter has been inserted in the roller-table D and fastened therein by the usual shellac.

In order to heat the shellac introduced into the aperture in the roller-table D, a heating-arm I is provided, secured on one of the spring-arms C and extending outwardly and transversely therefrom, as plainly indicated in Figs. 2 and 5, so that the outer end of this heating-arm I projects a considerable distance from the peripheral face of the balance-wheel D². By this arrangement the heating-arm I may be held to a gas-flame or the like for heating the arm, and consequently the corresponding spring-arm C and the roller-table D, with a view to melt the shellac in the aperture in the roller-table D.

The inner ends of the spring-arms C form integral parts of a tube C², mounted to slide longitudinally in a suitable bearing A', formed within the bearing A, and the tube C² is prevented from turning by the use of a screw C³, screwing in the bearings A A' and projecting into a longitudinal slot C⁴, formed in the tube C². The rear end of the tube C² is secured to a rod J, extending rearwardly through the bearing A, and on the outer end of this rod J screws a knob J', adapted to be pressed by the operator for opening the jaws C', as hereinafter more fully described.

On the rod J adjacent to the hub of the knob J' screws a nut J², on which presses one end of a spring J³, coiled around the rod J and abutting against the rear end of the bearing A. By the arrangement described the rod J is normally held in an innermost position, with the knob J' projecting from the end of the handle B to permit the operator to press the knob J' to compress the spring J³ and to move the rod J forward and with it the tube C², the spring-arms C, and their jaws C'.

On the spring-arms C are secured half-cones C⁵, resting with their sides on the outer end of the tubular bearing A, so as to close the jaws C' at the time the pressure on the knob J' is released, and the spring J² pushes the rod J rearwardly and with it the spring-arms C.

By the arrangement described the operator on pressing the knob J' causes a ready opening of the jaws C' to allow the latter to engage the peripheral face of the roller-table D, and when the operator releases the knob J' then the jaws C' close to firmly clamp the roller-table in position and with it the balance-wheel.

It is understood that when placing the balance-wheel in position care should be taken to bring the ruby-pin aperture directly opposite the ruby-pin E held between the jaws F' F². It is understood that when the roller table is in position on the jaws C' the jewel-holder F is in rearmost position, as indicated in Fig. 1, and in order to secure the ruby-pin E in position in the roller-table the operator first places some shellac or the like in the ruby-pin aperture, then heats the heating-arm I to melt the shellac, and then the operator slides the slide G forward, and with it the holder F, so that the ruby-pin E passes into the shellacked aperture, and as soon as the shellac has hardened the operator presses the finger-piece F⁵ and pushes the slide G rearwardly, so that the jaws F' F² disengage the ruby-pin and the latter remains fastened in position in the roller-table D,

Having thus described my invention, I claim as new and desire to secure by Letters Patent—

1. A jewel-pin setter comprising a tubular bearing, a pair of spring-jaws slidable therein for clamping the roller-table, a jewel-holder having jaws for clamping the ruby-pin, and a slide on which the said jewel-holder is held adjustable, the spring-jaws being provided with half-cones normally resting against the outer end of said tubular bearing to maintain said jaws in closed relationship.

2. A jewel-pin setter comprising a handled tubular bearing, a pair of spring-jaws mounted to slide in said bearing and projecting beyond the end thereof, means for opening and closing the said spring-jaws, a jewel-holder arranged lengthwise of the said bearing and provided with a fixed and a spring-pressed jaw, a slide mounted to slide on the said tubular bearing and in which the said jewel-holder is adjustably held, and a spring interposed between the said slide and the said bearing for holding the slide against accidental movement.

3. A jewel-pin setter comprising a handled tubular bearing, a pair of spring-jaws mounted to slide in said bearing and projecting beyond the end thereof, means for opening and closing the said spring-jaws, a jewel-holder arranged lengthwise of the said bearing and provided with a fixed and a spring-pressed jaw, a slide mounted to slide on the said tubular bearing and in which the said jewel-holder is adjustably held, a spring interposed between the said slide and the said bearing for holding the slide against accidental movement, and means for limiting the sliding motion of the said slide on the said bearing.

4. A jewel-pin setter provided with a handled tubular bearing, a pair of spring-jaws supported by the said bearing, means for opening and closing the said jaws, a slide having a limited sliding movement on the said bearing, a jewel-holder having a rod mounted to slide in the said slide, a nut for adjusting the said rod, and a spring pressing the said jewel-holder at the said bearing.

5. A jewel-pin setter provided with a handled tubular bearing, a pair of spring-jaws supported by the said bearing, means for opening and closing the said jaws, a slide having a limited sliding movement on the said bearing, a jewel-holder having a rod mounted to slide in the said slide, a nut for adjusting the said rod, and a spring pressing the said jewel-holder at the said bearing, the spring being in the shape of a split ring encircling the said slide in an annular groove.

In testimony whereof I have signed my name to this specification in the presence of two subscribing witnesses.

ORRIL ELBRIDGE SCOTT.

Witnesses:
GUY C. SCOTT,
JAMES K. FULLERTON.